United States Patent
Vincent et al.

[11] 3,906,040
[45] Sept. 16, 1975

[54] DIBENZOCYCLOHEPTENES SUBSTITUTED

[75] Inventors: Michel Vincent, Bagneux; Georges Remond, Versailles; Michel Laubie, Vaucresson, all of France

[73] Assignee: Science Union et Cie, Society Francaise de Recherche Medicale, Suresnes, France

[22] Filed: Jan. 24, 1973

[21] Appl. No.: 326,362

[30] Foreign Application Priority Data
Jan. 24, 1972  United Kingdom............... 3237/72

[52] U.S. Cl.... 260/558 R; 260/239 B; 260/239 BC; 260/243 B; 260/247.2 A; 260/268 T; 260/293.61; 260/293.62; 260/306.7; 260/307 F; 260/326 A; 260/326.33; 260/558 P; 260/559 P; 424/244; 424/246; 424/248; 424/250; 424/267; 424/270; 424/272; 424/274; 424/324
[51] Int. Cl.² ....................................... C07C 103/78
[58] Field of Search ..................... 260/558, 559

[56] References Cited
UNITED STATES PATENTS
3,287,409  11/1966  Leonard et al. ............... 260/558
3,726,870  4/1973   Rey-Bellet et al. ............ 260/558

*Primary Examiner*—Harry I. Moatz
*Attorney, Agent, or Firm*—Omri M. Behr

[57] ABSTRACT

The invention relates to new dibenzo (a,d) cycloheptenes of the formula:

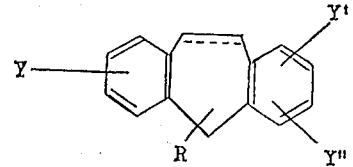

wherein Y, Y' and Y" are selected from the group consisting of hydrogen, halogen, lower alkyl substituted lower alkyl, lower alkoxy and trifluoromethyl;

R which may attached in 5-, 10- or 11- position represents a radical of the formula:

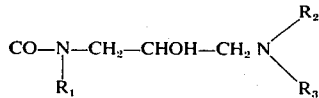

wherein $R_1$ is hydrogen, substituted lower alkyl or lower alkyl, $R_2$ is hydrogen, lower alkyl substituted lower alkyl or lower alkenyl, $R_3$ is lower alkyl substituted lower alkyl, lower alkenyl, lower alkynyl or aralkyl, or, $R_2$ and $R_3$ together represent the alkylene moiety of a nitrogenous heterocycle, and salts thereof with an acid.

They have therapeutical uses.

14 Claims, No Drawings

DIBENZOCYCLOHEPTENES SUBSTITUTED

This invention relates to new substituted 1,3-diamino 2-propanols and to a process for their preparation.

The present invention provides a new substituted 1,3-diamino 2-propanols of the general formula (I):

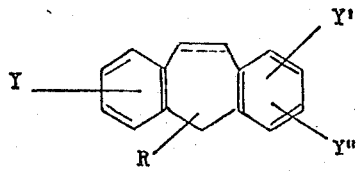

Wherein Y, Y' and Y'' which may be the same or different, each represent a hydrogen atom, a halogen atom, a lower alkyl radical, substituted lower alkyl radical, a lower alkoxy radical or a trifluoromethyl group.

R which may be attached in 5-, 10- or 11-position represents a radical of the general formula (II):

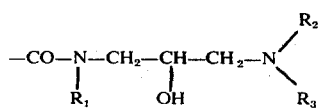

wherein $R_1$ represents a hydrogen atom, a lower alkyl or substituted lower alkyl radical, $R_2$ represents a hydrogen atom, a lower alkyl radical, substituted lower alkyl radical, a lower alkenyl radical or benzyl, $R_3$ represents a lower alkyl radical, substituted lower alkyl radical, a lower alkenyl radical, a lower alkynyl, or an aryl lower alkyl radical, or, $R_2$ and $R_3$ may be joined together to form with the nitrogen atom to which they are attached a nitrogenous heterocycle having from 5 to 7 links and which may include another hetero atom, and the dotted line inidcates the eventual presence of a double bond.

The present invention provides also the acid addition salt thereof with a mineral or organic acid.

As far as the invention is concerned, the term lower alkyl is intended to designate a hydrocarbyl residue having from 1 to 6 carbon atoms in straight or branched chain. The substituents on the substituted lower alkyl radical may be hydroxy, a lower alkoxy or a dilower alkyl amino group. Examples of such lower alkyl are methyl, ethyl, iso propyl, sec butyl, neo pentyl, ter butyl or n-hexyl.

The term halogen designates preferably fluorine or chlorine. It may be also bromine or iodine.

The term "lower alkenyl" designates a hydrocarbyl residue with one or several double bonds having from 2 to 10 carbon atoms is straight or branched chain. Examples of such alkenyl are allyl, methallyl, isopentenyl, dimethyl allyl, butenyl, triallyl methyl, and the like.

The term "lower alkoxy" designates preferably an alkyloxy radical wherein the alkyl residue has from 1 to 6 carbon atoms.

The term aryl lower alkyl designates a phenyl -or a substituted phenyl-bearing a hydrocarbyl residue having from 1 to 4 carbon atoms. The hydrocarbyl residue may be straight or branched chain. The phenyl ring may carry substituent or substituents such as methoxy, trifluoromethyl, chloro. Examples of such aryl (lower alkyl) radicals are 3,4-dimethoxy benzyl, benzyl, m-trifluoromethyl benzyl, α-methyl benzyl, p-chlorobenzyl, phenylethyl, phenyl propyl or β-methyl phenylethyl.

The term "lower alkynyl" designates a hydrocarbon residue having a triple bond, having from 2 to 6 carbon atoms such as ethynyl, propyn-1 yl, propyn-2 yl or methyl-1 butyn-2 yl.

The nitrogenous heterocycle may be pyrrolidine, piperidine or hexamethylene imine. It may also include another heteroatom such as a nitrogen atom, a sulfur atom or an oxygen atom. Examples of such heterocycles are oxazolidine, morpholine, thiazolidine, thiamorpholine, piperazine, or homo morpholine. These heterocycles may carry also one or several alkyl residues.

The compounds of the present invention are endowed with interesting pharmacological properties, namely in the cardio-vascular field.

They possess anti-arythmic, cardio depressive, vasodilatatory ant anti-hypertensive properties. They possess little or not any beta-blocker property.

They found a therapeutic use as a drug for the cardiac rythm, especially in the treatment of arythmias, tachycardias, angor pectoris and infarctus.

The invention relates also to pharmaceutical compositions comprising as active ingredient one or more compounds of general formula (I) together with an inert non-toxic pharmaceutical carrier.

The pharmaceutical compositions are those suitable for administration by oral, parenteral, sublingual or rectal way, for example ampuls, phials, multidoses flasks, tablets, coated tablets, granules, gelules, capsules, sublingual tablets, drinkable solutions or emulsions and suppositories.

They are prepared by known methods.

The dosages may vary broadly depending of the age of the patient, the therapeutic uses and the way of administration. By the adult they vary from 25 mg to 150 mg per unit dosage, especially by intraveinous way, once to five times a day.

The pharmaceutical compositions may include also another active ingredient having similar or synergistic properties, as for example a β-blocker such propanol or practolol, a coronaro-dilatator such as dipyridamol or a nitrated polyol, and an coagulant agent such as Ethyl-biscoumacetate or Acenocoumarol or a digitalin-like compound.

The present invention provides also a process for preparing a compound of general formula (I) which consists in reacting a compound of general formula (III):

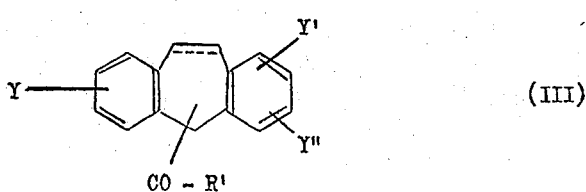

wherein Y, Y' and Y'' have the above-given meanings and CO—R' is attached in the 5-, 10-, or 11-position. R' represents a halogen atom other than fluorine, an hydroxy, an alcoxy radical having from 1 to 5 carbon atoms or a

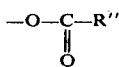

residue, wherein R'' represent a halogen, other than fluorine, a lower alkyl having 1 to 5 carbon atoms or the residue

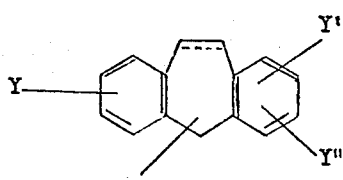

wherein the definition of the substituents Y, Y', and Y'' remains unaltered with a diamino propanol of the general formula (IV):

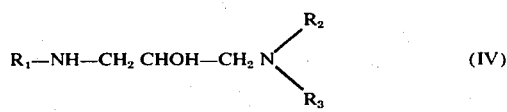

wherein the definitions of $R_1$, $R_2$ and $R_3$ are those previously stated to obtain a compound of general formula (I):

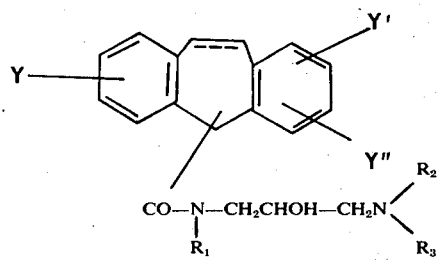

wherein the definitions of the substituents $R_1$, $R_2$, $R_3$, Y, Y', Y'' are those previously stated which may be, if desired, salified by addition of a mineral or organic acid or when $R_2$ is benzyl, debenzylated by hydrogenolysis or hydrolysis in acidic medium to obtain a compound having the formula (V):

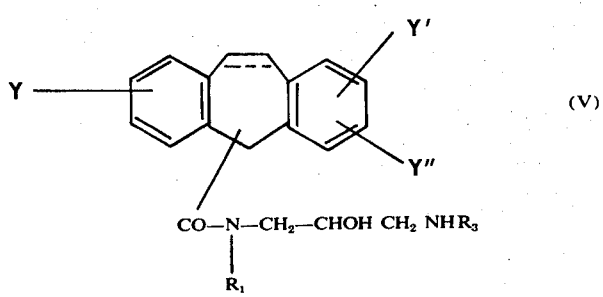

wherein the substituents Y, Y', Y'', $R_1$ and $R_3$ are defined as above and then, if desired, salified the latter by addition of an organic or mineral acid, or, maybe resolved into its optical isomers by means of a chemical bond with an optically active reagent.

This synthesis may also be effected starting with a resolved diaminopropanol of general formula (IV). By this way the synthesis give directly a compound of general formula (I) under an optically active form.

The production of salts of the compounds of general formula (I) may be carried out by contacting the base with a mineral acid such as hydrochloric, hydrobromic acid, sulphuric acid, phosphoric acid, nitric acid, or with an organic acid such as acetic acid, propionic acid, lauric acid, benzoic acid, salicylic acid, cinnamic acid, lactic acid, maleic acid, fumaric acid, pyruvic acid, glutamic acid, oxalic acid, methan sulphonic acid, glucose-1-phosphoric acid, pamoic acid.

The synthesis of compounds of general formula (I) may also be effected in the following manner:

The functionnal derivative of the dibenzocyclo heptene carboxylic acid of general formula (II) is preferably the chloride;

The condensation is effected in an inert organic medium such as an oxygenated solvent or an aromatic hydrocarbon;

The hydrogenolysis of compound of formula (I), when $R_2$ is benzyl, is effected by means of hydrogen in the presence of a catalysator belonging to the family of platinum, such as palladium or platinum.

The invention includes also as intermediates compounds:

a. the substituted phthalimides of general formula (VI):

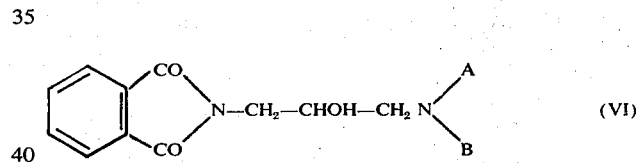

which may be racemic or under is resolved form, wherein A means a tri (lower alkenyl)-lower alkyl radical, benzyl or β-methyl phenyl ethyl radical B means methyl, benzyl or hydrogen or A and B together with the introgen atom to which they are attached, form a morpholino or piperidino radical;

b. the 1,3- diamino propanols-2 having the general formula (IV'):

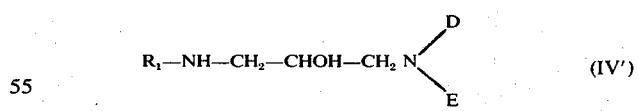

under racemic or optically active form,
wherein $R_1$ represents hydrogen or a methyl radical, D represents an allyl radical, a ter butyl radical, a tri (lower alkenyl) alkyl radical, benzyl or a β-methyl phenyl ethyl radical, E represents a hydrogen atom, a methyl, a benzyl or an allyl radical, or, D and E together form with the nitrogen atom to which they are fixed a morpholino or piperidino radical.

The starting materials, the (dibenzocycloheptadien 5-) carboxylic acids may be conveniently obtained according to the process described in U.S. Pat. No. 3,459,859 or preferably when substituted on the phenyl ring or rings according to the process of DAVIS (J. Med. Chem. 7 (1964) 88) or C. VAN DER STELT (J. Med. Chem. 4 (1961) 335).

The starting materials, the (dibenzocycloheptadien-10) or (dibenzocycloheptadien-11) carboxylic acids may be conviently obtained according to the process described by PROCTOR (J. Chem. Soc. 1969 (c) 1000) starting from the suitable dibenzocycloheptadien 11-one.

The starting materials, the (dibenzocycloheptatrien-10) or (dibenzocycloheptatrien-11) carboxylic acids may be obtained according to the process described by WALKER (J. Org. Chem. 36 (1971) 466).

The 1,3-diamino propanols-2 of general formula (IV) are all the most new compounds.

They may be conveniently obtained by hydrolysing a substituted phthalimide of the formula:

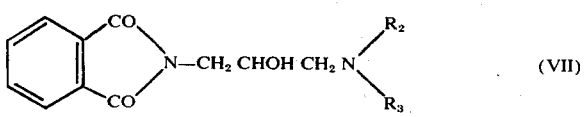

(VII)

Wherein R$_2$ and R$_3$ are defined as above, by means of a mineral acid according to the procedure described by D. J. Triggle and B. Belleau Canad. J. of Chem. 40 (1962) 1215;

by means of hydrazine according to the procedure described by B. R. Baker J. of Am. Chem. Soc. 77 (1955) 5908;

by means of phenylhydrazine according to the procedure described by Boissonas Nature 169 (1952) 154;

by means of methyl hydrazine or 2,5-dichlorophenylhydrazine according to the procedure described by A. F. Rosenthal J. Org. Chem. 22 (1957) 89, to obtain a 1,3-diamino propanol-2 of general formula (IV) wherein R$_1$ is hydrogen and R$_2$ and R$_3$ are defined as above, or by opening the oxirane ring of a 1,2-epoxy 3-amino propane of formula (VIII)

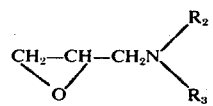

wherein R$_2$ and R$_3$ are defined as above,
with ammonia or a primary lower alkylamine,
to obtain a compound of general formula IV wherein R$_1$ is hydrogen or a lower alkyl radical using a procedure similar to that described by E. A. Steck J. of AM. Chem. Soc. 70 (1948) 4063.

The starting 1,2-epoxy 3-diamino propanes of general formula VIII are obtained in a process similar to that described by Steck by condensing the appropriate amine

R$_2$ and R$_3$ being defined as above, with epichlorhydrin.

The starting substituted phthalimides of formula (VII) are prepared by condensing N-(2,3-epoxy propyl) phthalimide with an amine having the formula:

(wherein R$_2$ and R$_3$ are defined as above) in an inert solvent and recovering said substituted phthalimide.
The following examples explain the invention without restricting it. The temperatures indicated thereafter are expressed in degrees centigrade.

EXAMPLE 1

1-[dibenzo (a,d) 1,4-cycloheptadienyl-5 carboxamido] 3-(N-benzyl N-isopropyl amino) 2-propanol and its hydrochloride 13,3 g of 1-amino 3-(N-benzyl N-isopropyl amino) 2-propanol, obtained according to the process described by E. A. STECK (J. of Am. Chem. Soc. 70 (1948) 4063) are added to a solution of 15,1 g of (dibenzo (a,d) 1,4-cycloheptadienyl -5) carbonyl chloride in 45 ml ethylether while cooling to + 10°. Then, the reaction mixture is kept at room temperature under stirring during 12 hours.

The hydrochloride of 1-[dibenzo (a,d) 1,4-cycloheptadienyl-5 carboxamido] 3-(N-benzyl N-isopropylamino) 2-propanol precipitates and is isolated by sucction, then washed twice with ethylether and dried under vacuum. 20,1 g of the hydrochloride are thus recovered under the form of crystals melting with decomposition at 135°C.

EXAMPLE 2

1-[dibenzo (a,d) 1,4-cycloheptadienyl-5 carboxamido] 3-(N-benzyl N-terbutyl amino) 2-propanol and its hydrochloride Using the same procedure as described in example 1 and starting from 16.1 g of (dibenzo (a,d) 1,4-cycloheptadienyl-5) carbonyl chloride and 14.9 g of 1-amino 3-(N-benzyl N-terbutylamino) 2-propanol, 1-[dibenzo (a,d) 1,4-cycloheptadienyl 5-carboxamido] 3-(N-benzyl N-terbutylamino) is obtained with a yield of 71 %. The free base is then coverted into its hydrochloric acid addition salt which melts at 218°–220°.

EXAMPLE 3

1-[dibenzo (a,d) cycloheptatrienyl [5H] 5-carboxamido] 3-(morpholino-4) 2-propanol and its hydrochloride Using the procedure of example 1, starting from (dibenzo (a,d) cycloheptatrienyl [5H]-5) carbonyl chloride and from 3-morpholino 1-amino 2-propanol. 1-[dibenzo (a,d) cycloheptatrientyl-5 [5H] carboxamido] 3-(morpholino-4) 2-propanol is obtained as crystals melting at 160°.

Its hydrochloride is formed by dissolving 0.387 g of the base in 10 ml hydrochloric acid 0.1 N and distillating off the water under reduced pressure.

The starting material 3-morpholino 1-amino 2-propanol, new compound, is obtained in the following fashion:

a. condensing N-(2,3-epoxypropyl) phtalimide with morpholine, b. hydrazinolysing the N-(3-morpholino 2-hydroxypropyl) phtalimide thus obtained in 3-morpholino 1-amino 2-propanol (B.P. = 114°–118°/0.2mm Hg).

EXAMPLE 4

1-[dibenzo (a,d) 1,4-cycloheptadienyl-5 carboxamido] 3-(morpholino-4) 2-propanol and its hydrochloride Using the procedure described in example 1 and starting from (dibenzo (a,d) 1,4-cycloheptadienyl-5) carbonyl chloride and from 3-morpholino 1-amino 2-propanol 1-[dibenzo (a,d) 1,4-cycloheptadienyl-5 carboxamido] 3-(morpholino-4) 2-propanol is obtained which is isolated under the form of its hydrochloride melting at 242° after recrystallization from methanol.

EXAMPLE 5

1-[dibenzo (a,d) 1,4-cycloheptadienyl-5 carboxamido] 3-piperidino 2-propanol and its hydrochloride Using the same procedure as in example 1 and starting from (dibenzo (a,d) 1,4-cycloheptadienyl-5) carbonyl chloride and from 3-piperidino 1-amino 2-propanol, 1-[dibenzo (a,d) 1,4-cycloheptadienyl-5 carboxamido] 3-piperidino 2-propanol is obtained and transformed into its hydrochloride melting at 243°–244° after recrystallization from ethanol.

The starting material 1-amino 3-piperidino 2-propanol, new product, is obtained by the following way:

a. condensing N-(2,3-epoxypropyl) phtalimide with piperidine, b. hydrazinolysing the N-(3-piperidino 2-hydroxypropyl) phtalimide thus obtained into 1-amino 3-piperidino 2-propanol (B.p. = 92°–94°/0.2mm Hg).

EXAMPLE 6

1-[dibenzo (a,d) 1,4-cycloheptadienyl-5 carboxamido] 3-diallylamino 2-propanol and its hydrochloride Using the same procedure as in example 1 and starting from 3-diallylamino 1-amino 2-propanol and from [dibenzo (a,d) 1,4-cycloheptadienyl-5] carbonyl chloride, 1-[dibenzo (a,d) 1,4-cycloheptadienyl-5 carboxamido] 3-diallylamino 2-propanol is obtained as crystals melting at 90°–91° after recrystallization from a mixture of hexane and ether.

The free base is then converted into its hydrochloride by dissolving 0.39 g of the base in 10 ml of hydrochloric acid 0,1 N and evaporated to dryness under reduced pressure.

The starting material 3-diallylamino 1-amino 2-propanol is obtained by condensing diallylamine with N-(2,3-epoxypropyl) phtalimide and hydrazinolysing the N-(3-diallylamino 2-hydroxypropyl) phtalimide into 3-diallylamino 1-amino 2-propanol (B.p. = 95°–98°/0.4mm Hg).

EXAMPLE 7

1-[2,3-dimethoxy dibenzo (a,d) 1,4-cycloheptadienyl-5-carboxamido] 3-(N-terbutyl N-benzylamino) 2-propanol and its hydrochloride Using the same prodedure as in example 1 and starting from (2,3-dimethoxy dibenzo (a,d) 1,4-cycloheptadienyl-5) carbonyl chloride (obtained according to PROCTOR J. Chem. Soc. (c) 1969, 1000) 1-[2,3-dimethoxydibenzo (a,d) 1,4-cyclo heptadienyl-5 carboxamido] 3-(N-terbutyl N-benzylamino) 2-propanol is obtained as crystals melting at 68°–70°.

Its hydrochloride is formed by reacting 0.51 g of the free base with 10 ml of hydrochloric acid 0,1 N and evaporating to dryness.

The starting 3-(N-benzyl N-terbutylamino) 1-amino 2-propanol is obtained from the corresponding phtalimide using the same procedure as above (B.p. = 124°–135°/0.01mm Hg, M.p. = 75°).

EXAMPLE 8

1-[dibenzo (a,d) 1,4-cycloheptadienyl-5 N-methyl carboxamido ] 3-(N-terbutyl N-benzylamino) 2-propanol and its hydrochloride.

Using the procedure of example 1 and starting from 3-(N-terbutyl N-benzyl amino) 1-methylamino 2-propanol, 1-[dibenzo (a,d) 1,4-cycloheptadienyl-5 N-methyl carboxamido] 3-(N-terbutyl N-benzylamino) 2-propanol is obtained. It occurs as crystals melting at 101°–104° after recrystallization from ether.

The hydrochloric acid addition salt is obtained by contacting the free base with a stoechiometric amount of hydrochloric acid 0,1 N and distillating off the water till dryness under reduced pressure.

The starting material 3-(N-terbutyl N-benzylamino) 1-methylamino 2-propanol is obtained according to the following procedure:

condensing epichlorhydrin with N-terbutyl N-benzyl amine into 3-(N-terbutyl N-benzylamino) 1,2-epoxy propane (B.p. = 105°–110°/0.05mm Hg);

reacting said epoxyde with methylamine to obtain 3-(N-terbutyl N-benzylamino) 1-methylamino 2-propanol (B.p. = 134°–135°/0.05mm Hg).

EXAMPLE 9

1-[dibenzo (a,d) 1,4-cycloheptadienyl-5 carboxamido] 3-(triallyl methylamino) 2-propanol and its hydrochloride Using the procedure of example 1 and starting from 3-(triallyl methylamino) 1-amino 2-propanol 1-[dibenzo (a,d) 1,4-cycloheptadienyl-5 carboxamido] 3-triallyl methylamino 2-propanol is obtained. After recrystallization from cyclohexane it melts at 118°.

The base is converted into its hydrochloride by dissolving 0.44 of the base in 10ml of 0.1 N-hydrochloric acid and evaporating the water under reduced pressure.

The starting material, the 3-(triallylmethylamino) 1-amino 2-propanol is obtained by condensing triallylmethylamine with (2,3-epoxypropyl) phtalimide and hydrazinolysing the 3-(triallylmethylamino) 2-hydroxypropyl phtalimide, (M.p. 163°– 164° as hydrochloride).

EXAMPLE 10

1-[dibenzo (a,d) 1,4-cycloheptadienyl-5 carboxamido] 3-($\beta$-methyl phenylethyl amino 2-propanol and its neutral succinate.

Using the procedure as in example 1 and starting from 3-($\beta$-methyl phenylethyl) 1-amino 2-propanol 1-[dibenzo (a,d) 1,4-cycloheptdienyl-5 carboxamido] 3-($\beta$-methyl phenyl ethylamino) 2-propanol is obtained.

The base is then coverted into its neutral succinate which melts at 140° after recrystallization from a mixture of ethanol-ether.

The 3-(β-methylphenylethyl) amino 1-amino 2-propanol, which is a new product, is produced from N-(2,3-epoxypropyl) phthalimide and β-methyl phenylethylamine. The thus formed [3-(β-methyl phenylethyl)amino 2-hydroxypropyl] phtalimide (M.p.=120°) is then converted by reaction with hydrazine into 3-(β-methylphenyl ethyl) amino 1-amino 2-propanol (B.p. = 135°/0.05mm Hg).

EXAMPLE 11

1-[dibenzo (a,d) 1,4-cycloheptadienyl5 carboxamino] 3-(N-benzyl N-methyl amino) 2-propanol and its hydrochloride Using the procedure of example 1 and starting from 3-(N-benzyl N-methyl amino) 1-amino 2-propanol, 1-[dibenzo (a,d) 1,4-cycloheptadienyl-5 carboxamido] 3-(N-benzyl N-methyl amino) 2-propanol is obtained as crystals melting at 110°.

The free base is then converted into its hydrochloride by dissolving the former in hydrochloric acid 0,1 N and distillating off the water under reduced pressure. The 3-(N-benzyl N-methylamino) 1-amino 2-propanol (B.p = 115°/0.01mm Hg) is obtained from [3(N-methyl N-benzylamino) 2-hydroxy propyl] phthalimide (M.p. = 93°–95°) by hydrazinolysis.

EXAMPLE 12

1-[3-chloro dibenzo (a,d) 1,4-cycloheptadienyl -5 carboxamido] 3-terbutyl amino 2-propanol and its hydrochloride Following the procedure of example 1 and starting from 3-terbutylamino 1-amino 2-propanol and [3-chlorodibenzo (a,d) 1,4-cycloheptadienyl-5] carbonyl chloride, 1-[3-chlorodibenzo (a,d) 1,4-cycloheptadienyl 5-carboxamido] 3-terbutyl amino 2-propanol is obtained. The base is thereafter coverted into its hydrochloride by a conventional method.

The hydrochloride melts at 157°–160° after recrystallization from a mixture of methanol and ethyl ether.

The starting material (3-chlorodibenzo (ad) 1,4-cycloheptadienyl 5-) carbonyl chloride is produced according to known methods from 3-chlorodibenzo (a,d) 1,4-cycloheptadiene 11- one described by FOUCHE, Bull, Soc. Chim. France 1970 1381.

EXAMPLE 13

Using the procedure of example 1 and starting from (dibenzo (a,d) cycloheptatrienyl [5H] -5) carbonyl chloride, 1-[dibenzo (a,d) cycloheptatrienyl [5H] 5-carboxamido] 3-terbutylamino 2-propanol is produced, melting at 117°–118° after recrystallization from ethyl ether.

Its hydrochloride is obtained by contacting the base with the stoichiometric amount of hydrochloric acid and evaporation to dryness.

EXAMPLE 14

1-[dibenzo (a,d) cycloheptatriene [5H] 10-carboxamido] 3-terbutylamino 2-propanol and its neutral succinate Following the procedure of example 1 and starting from [dibenzo (a,d) cycloheptatrienyl [5H] -10] carbonyl chloride, 1-[dibenzo (a,d) cycloheptatrienyl [5H] carboxamido -10] 3-terbutylamino 2-propanol is produced.

It is converted into its neutral succinate by addition in stoichiometric amount, of a solution of succinic acid in ethyl other.

This acid addition salt melts at 159°–160° after recrystallization from propanol.

The starting material, (dibenzo (a,d) cycloheptatrienyl [5H] -10) carbonyl chloride is obtained according to known methods from (dibenzo (a,d) cycloheptatrienyl) [5H] -10) carboxylic acid (WALKER J. Org. Chem. 36 (1971) 466).

In a similar fashion starting from (dibenzo (a,d) 1,4-cycloheptadienyl 10-) carbonyl chloride and from 3-(N-terbutyl N-benzylamino) 1-amino 2-propanol, 1-[dibenzo (a,d) cycloheptadienyl 10-carboxamido] 3-N-terbutyl N-benzylamino) 2-propanol is produced.

EXAMPLE 15

1-[dibenzo (a,d) 1,4-cycloheptadienyl 5-carboxamido] 3-dibenzylamino propanol

Using the procedure of example 1 and starting from 3-dibenzylamino 1-amino 2-propanol, 1-[dibenzo (a,d) 1,4-cycloheptadienyl 5-carboxamido] 3-dibenzylamino 2-propanol is produced in a quantitative yield.

The starting material 3-dibenzylamino 1-amino 2-propanol is obtained from N-(2,3-epoxypropyl) phthalimide and dibenzylamine by the methods already described. The intermediate (3-(dibenzylamino) 2-hydroxy propyl) phthalimide is converted by reacting with hydrazine hydrate into 3-(dibenzylamino) 1-amino 2-propanol (B.p. = 170°–190°/0.1mm Hg).

EXAMPLE 16

1-[dibenzo (a,d) 1,4-cycloheptadienyl 5-carboxamido] 3-N-isopropylamino 2-propanol and its acid addition salts 12,4 g of 1-[dibenzo (a,d) 1,4-cycloheptadienyl 5-carboxamido] 3-(N-benzyl N-isopropylamino) 2-propanol (hydrochloride) are dissolved in 70 ml ethanol. 4 g of palladised charcoal containing 10 % of palladium are added to this solution.

The air is expelled from the vessel by a stream of nitrogen and thereafter hydrogen is bubbled into it at room temperature under a pressure of 50 atm during 6 hours.

The catalyst is then eliminated by filtration. The filtrate is evaporated to dryness under reduced pressure and the dry residue is taken up with 50 ml water. This aqueous solution is rendered weakly acid by addition of N-hydrochloric acid until a pH value of 2. The solution is extracted twice with ethyl ether and the organic washings are discarded. The aqueous phase is made alkaline by adding sodium carbonate until a pH value of about 10.

The free base precipitates and is separated by sucction and dried. It is purified by dissolving it in 50 ml ether and cooling. The base crystallized by standing. The crystals are separated, washed with cooled ether and dried at room temperature under reduced pressure.

5,1 g of 1-[dibenzo (a,d) 1,4-cycloheptadienyl 5-carboxamido] 3-isopropyl amino 2-propanol are thus recovered. It melts at 119°–120°.

EXAMPLE 17

1-[dibenzo (a,d) 1,4-cycloheptadienyl 5-carboxamido] 3-terbutylamino-terbutylamino-propan and its hydrochloride Following the procedure of example 16 and starting from 13,8 g of 1-[dibenzo (a,d) 1,4-cycloheptadienyl 5-carboxamido] 3-(N-benzyl N-terbutylamino) 2-propanol (hydrochloride), 1-[dibenzo (a,d) 1,4-cycloheptadienyl 5-carboxamido] 3-terbutylamino 2-propanol is produced with a yield of about 86 %.

Its hydrochloride is produced by dissolving the base in a stoichiometric amount of hydrochloric acid in ether and evaporating the solvent till dryness. The hydrochloride melts at 154° (dec.).

EXAMPLE 18

1-[dibenzo (a,d) 1,4-cycloheptadienyl 10-carboxamido] 3-terbutylamino 2-propanol and its hydrochloride Using the procedure of example 16 and starting from 1-[dibenzo (a,d) 1,4-cycloheptadienyl 10-carboxamido] 3-(N-terbutyl N-benzylamino) 2-propanol, 1-[dibenzo (a,d) 1,4-cycloheptadienyl 10-carboxamido] 3-terbutylamino 2-propanol is obtained which melts after recrystallization from heptane, at 115°.

By dissolving the latter in a stoichiometric amount of 0.1 N hydrochloric acid and evaporating till dryness the solution, the hydrochloride of 1-[dibenzo (a,d) 1,4-cycloheptadienyl 10-carboxamido] 3-terbutylamino 2-propanol is recovered.

EXAMPLE 19

Following the procedure of example 16 and starting from 1-[dibenzo (a,d) 1,4-cycloheptadienyl 5-carboxamido] 3-(N-benzyl N-methylamino) 2-propanol, 1-[dibenzo (a,d) 1,4-cycloheptadienyl 5-carboxamido] 3-methylamino 2-propanol is obtained.

Its hydrochloride after recrystallization from acetonitrile melts at about 145°–150°.

EXAMPLE 20

Following the procedure of example 16 and starting from 1-[dibenzo (a,d) 1,4-cycloheptadienyl 5-carboxamido] 3-dibenzylamino 2-propanol, 1-[dibenzo (a,d) 1,4-cycloheptadienyl 5-carboxamido] 3-benzylamino 2-propanol is produced and isolated as the hydrochloride melting at 200°C.

What we claim is:

1. A dibenzo cycloheptene of the formula

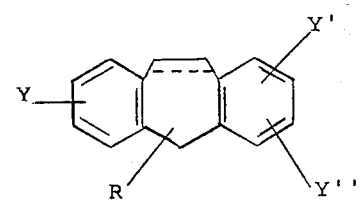

wherein:

Y, Y' and Y'' are selected from the group consisting of hydrogen, halogen, lower alkyl, substituted lower alkyl, lower alkoxy and trifluoromethyl;

R, attached to the carbon in 5-, 10- or 11-position, represents a 1,3-diamino propanol-2 chain having the formula:

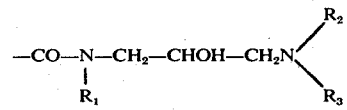

wherein $R_1$ is selected from the group consisting of hydrogen, lower alkyl and substituted lower alkyl, $R_2$ is selected from the group consisting of hydrogen, lower alkyl, substituted lower alkyl, lower alkenyl and benzyl, $R_3$ is selected from the group consisting of lower alkyl, substituted lower alkyl, lower alkenyl, lower alkynyl, phenyl lower alkyl and mono and di substituted phenyl lower alkyl, wherein the alkyl moieties of acid phenyl alkyl groups possess 1–4 carbon atoms, and the dotted line indicates an optional 10–11 double bond wherein the lower alkyl moiety is a branched or straight chain hydrocarbyl moiety of 1–6 carbon atoms, the substituents on the substituted lower alkyl moiety are an hydroxy, a lower alkoxy and a di-lower alkyl amino, wherein said lower alkoxy and lower alkyl moieties contain 1–6 carbon atoms, the substituents on said substituted phenyl moiety are methoxy, trifluoromethyl and chloro, and their acid addition salt with a therapeutically compatible mineral or organic acid.

2. A dibenzo cycloheptene of claim 1 of the formula

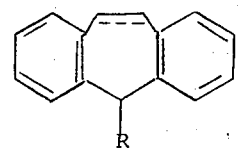

wherein
R, represents a 1,3-diamino propanol-2 chain having the formula:

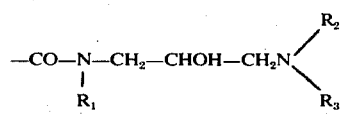

wherein $R_1$ is selected from the group consisting of hydrogen and methyl, $R_2$ is selected from the group consisting of hydrogen, and benzyl $R_3$ is selected from the group consisting of isopropyl, benzyl, triallyl methyl, β-methylphenethyl, tert butyl, and methyl, and the dotted line indicates an optional 10–11 double bond and their acid addition salts with a therapeutically compatible mineral or organic acid.

3. A compound of claim 2 selected from the group consisting of 1-[dibenzo(a,d)-1,4-cycloheptadienyl 5-carboxamido] 3-(N-triallyl methylamino) 2-propanol and its hydrochloride.

4. A compound of claim 2 selected from the group consisting of 1-[dibenzo (a,d) 1,4-cycloheptadienyl 5-carboxamido]3-N-isopropylamino 2-propanol and its acid addition salts.

5. A compound of claim 1, having the formula:

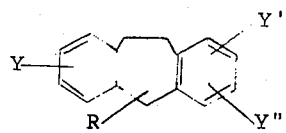

wherein R, Y, Y' and Y" are defined as in claim 1.

6. A compound of claim 1 having the formula:

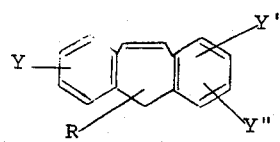

wherein R, Y, Y' and Y" are defined as in claim 1.

7. A compound of claim 1 under racemic or optically active form.

8. A compound of claim 2 selected from the group consisting of 1-[dibenzo (a,d) 1,4-cycloheptadienyl 5-carboxamido] 3-terbutylamino 2-propanol and its acid-addition salts.

9. A compound of claim 2 selected from the group consisting of 1-[dibenzo (a,d) 1,4-cycloheptadienyl-5-carboxamido] -3-(N-benzyl N-isopropylamino) 2-propanol and its hydrochloride.

10. A compound of claim 2 selected from the group consisting of 1-[dibenzo (a,d) 1,4-cycloheptadienyl-5-carboxamido] -3-(N-benzyl N-tertbutylamino) 2-propanol and its hydrochloride.

11. A compound of claim 2 selected from the group consisting of 1-[dibenzo (a,d) 1,4-cycloheptadienyl-5-N-methyl carboxamido]-3-(N-terbutyl N-benzylamino) 2-propanol and its hydrochloride.

12. A compound of claim 2 selected from the group consisting of 1-[dibenzo (a,d) 1,4-cycloheptadienyl-5-carboxamido]-3-(β-methyl phenylethyl amino 2-propanol and its neutral succinate.

13. A compound of claim 2 selected from the group consisting of 1-[dibenzo (a,d) cycloheptatriene [5H] 10-carboxamido]-3-tertbutylamino 2-propanol and its neutral succinate.

14. A compound of claim 2 selected from the group consisting of 1-[dibenzo (a,d) 1,4-cycloheptadienyl-5-carboxamido]-3-methylamino 2-propanol and its acid addition salts.

* * * * *